(12) United States Patent
Niizuma

(10) Patent No.: US 9,457,678 B2
(45) Date of Patent: Oct. 4, 2016

(54) VEHICLE ELECTRIC POWER FEEDING SYSTEM

(71) Applicant: Motonao Niizuma, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 20 days.

(21) Appl. No.: 14/187,859

(22) Filed: Feb. 24, 2014

(65) Prior Publication Data

US 2014/0167689 A1 Jun. 19, 2014

Related U.S. Application Data

(63) Continuation of application No. PCT/JP2012/073496, filed on Sep. 13, 2012.

(30) Foreign Application Priority Data

Sep. 13, 2011 (JP) ................. 2011-199404

(51) Int. Cl.
*H02J 7/00* (2006.01)
*B60L 11/18* (2006.01)
*H02J 5/00* (2016.01)
*H02J 7/02* (2016.01)

(52) U.S. Cl.
CPC .......... *B60L 11/182* (2013.01); *B60L 11/1833* (2013.01); *B60L 11/1835* (2013.01); *B60L 11/1838* (2013.01); *B60L 11/1846* (2013.01); *H02J 5/005* (2013.01); *H02J 7/025* (2013.01); *B60L 2200/26* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........................................ H02J 7/025
USPC .................................. 320/108, 109
See application file for complete search history.

(56) References Cited

U.S. PATENT DOCUMENTS 5,850,135 A * 12/1998 Kuki ................ B60L 11/1805
                                                    320/108
6,150,794 A * 11/2000 Yamada ............. B60L 11/007
                                                    320/107

(Continued)

FOREIGN PATENT DOCUMENTS

| CN | 201813192 U | 4/2011 |
|---|---|---|
| CN | 102089955 A | 6/2011 |

(Continued)

OTHER PUBLICATIONS

Japanese Office Action, dated Dec. 9, 2014, issued in corresponding Japanese Patent Application No. 2013-533712. Including English Translation. Total 5 pages.

(Continued)

*Primary Examiner* — Yalkew Fantu
*Assistant Examiner* — Johali Torres Ruiz
(74) *Attorney, Agent, or Firm* — Ostrolenk Faber LLP

(57) ABSTRACT

A vehicle electric power feeding system that is provided with an electric power feeding device (1A, 1B, 2A, 2B) that is provided at a location at which a vehicle (M) can stop; and a control means (3) that instructs the electric power feeding device (1A, 1B, 2A, 2B) to feed electric power to the vehicle in a stopped state (M: stopped vehicle) on the basis of a detection result of a detecting means (4) that detects the stopped state of the vehicle (M).

3 Claims, 3 Drawing Sheets

(56) References Cited

U.S. PATENT DOCUMENTS

| | | | |
|---|---|---|---|
| 2009/0174365 A1* | 7/2009 | Lowenthal et al. | 320/109 |
| 2010/0274656 A1 | 10/2010 | Genschel et al. | 705/14.27 |
| 2011/0184842 A1* | 7/2011 | Melen | B60L 5/005 |
| | | | 705/34 |
| 2011/0302078 A1* | 12/2011 | Failing | 705/39 |

FOREIGN PATENT DOCUMENTS

| | | |
|---|---|---|
| EP | 1 898 360 A1 | 3/2008 |
| EP | 2 431 212 A1 | 3/2012 |
| JP | 07-039007 | 2/1995 |
| JP | 2006-151268 | 6/2006 |
| JP | 2007-267578 | 10/2007 |
| JP | 2010-167898 | 8/2010 |
| JP | 2010-193657 | 9/2010 |
| JP | 2010-239690 | 10/2010 |
| JP | A-2011-106216 | 6/2011 |
| JP | A-2011-169043 | 9/2011 |

OTHER PUBLICATIONS

International Search Report and Written Opinion mailed Oct. 30, 2012 in corresponding PCT International Application No. PCT/JP2012/073496.

Chinese Office Action, dated Jul. 3, 2015, issued in corresponding Chinese Patent Application No. 201280044101.8. English translation. Total 15 pages.

* cited by examiner

VEHICLE ELECTRIC POWER FEEDING SYSTEM

This application is a Continuation of International Application No. PCT/JP2012/073496, filed on Sep. 13, 2012, claiming priority based on Japanese Patent Application No. 2011-199404, filed Sep. 13, 2011, the content of which is incorporated herein by reference in their entity.

TECHNICAL FIELD

The present invention relates to a vehicle electric power feeding system.

BACKGROUND ART

Patent Document 1 discloses a vehicle electric power feeding system that works in conjunction with traffic signals. That is to say, in this vehicle electric power feeding system, electric power feeding devices (wireless electric power transmission devices) of a number corresponding to the number of vehicles that are capable of stopping are provided at a predetermined region (electric power feeding point) on a road where vehicles stop when a traffic signal has become "red". In this vehicle electric power feeding system, as a result of the traffic signal becoming "red", electric power is fed wirelessly via each electric power transmission device to each vehicle that is stopped at the electric power feeding point.

PRIOR ART DOCUMENTS

Patent Document

[Patent Document 1] Japanese Unexamined Patent Application, First Publication No. 2010-193657

DISCLOSURE OF INVENTION

Problems to be Solved by the Invention

However, due to the fact that the vehicle electric power feeding system of the conventional art mentioned above operates in conjunction with traffic signals, electric power feeding is performed in a comparatively short time to vehicles that are temporarily stopped on the road. This vehicle electric power feeding system therefore cannot be applied to locations other than public roads where traffic signals are installed. However, in the case of considering the practicality of feeding electric power to vehicles, it is extremely important to realize short-time electric power feeding to vehicles at various locations, not just on public roads where traffic signals are installed. That is to say, short-time electric power feeding at various locations where vehicles can stop is important and indispensable for the adoption and convenience of vehicles that move with electric power serving as a power source, such as electric cars and hybrid cars.

The present invention was achieved in view of the aforementioned problems, and has as its object to realize electric power feeding to vehicles at various locations where vehicles can stop, without being limited to public roads.

Means for Solving the Problems

The present invention adopts the following constitution as a means for resolving the aforementioned issues. The vehicle electric power feeding system according to the first aspect of the present invention is provided with an electric power feeding device that is provided at a location at which a vehicle can stop, a detecting means that detects the stopped state of a vehicle, and a control means that instructs the electric power feeding device to feed electric power to a vehicle in a stopped state (stopped vehicle) on the basis of a detection result of the detecting means.

As for the second aspect of the present invention, in the vehicle electric power feeding system according to the aforementioned first aspect, a communication means that performs communication with the vehicle is further provided, with the vehicle being provided with the capability to communicate with the communication means, and the control means performing one or both of information exchange relating to the stopped state of the vehicle or power feeding by the power feeding device by performing communication with the vehicle via the communication means.

As for the third aspect of the present invention, in the vehicle electric power feeding system according to the aforementioned first aspect or second aspect, the electric power feeding device is provided with an electric power feeding coil, the vehicle is provided with an electric power receiving coil, and the electric power feeding device performs wireless electric power feeding to the vehicle by causing the electric power feeding coil to couple electromagnetically with the electric power receiving coil.

In accordance with the fourth aspect of the present invention, in the vehicle electric power feeding system according to any one of the aforementioned first to third aspects, the location at which the vehicle can stop is one or both of a parking area of various kinds of facilities or houses, and a temporary stopping place of a public establishment or private establishment.

In accordance with the fifth aspect of the present invention, in the vehicle electric power feeding system according to any one of the aforementioned first to fourth aspects, the detecting means is a laser radar or a television camera.

Effects of the Invention

The present invention performs electric power feeding to a vehicle in a stopped state (stopped vehicle) on the basis of a detection result of the detecting means that detects the stopped state of a vehicle. For this reason, compared to a conventional system that operates in conjunction with traffic signals, it is possible to realize electric power feeding to vehicles at various locations. Accordingly, it is possible to realize promotion of the adoption and improvement in the convenience of vehicles that move with electric power serving as the power source.

EMBODIMENTS FOR CARRYING OUT THE INVENTION

Hereinbelow, embodiments of the present invention shall be described in detail with reference to the drawings.

(First Embodiment)

Figure 1:
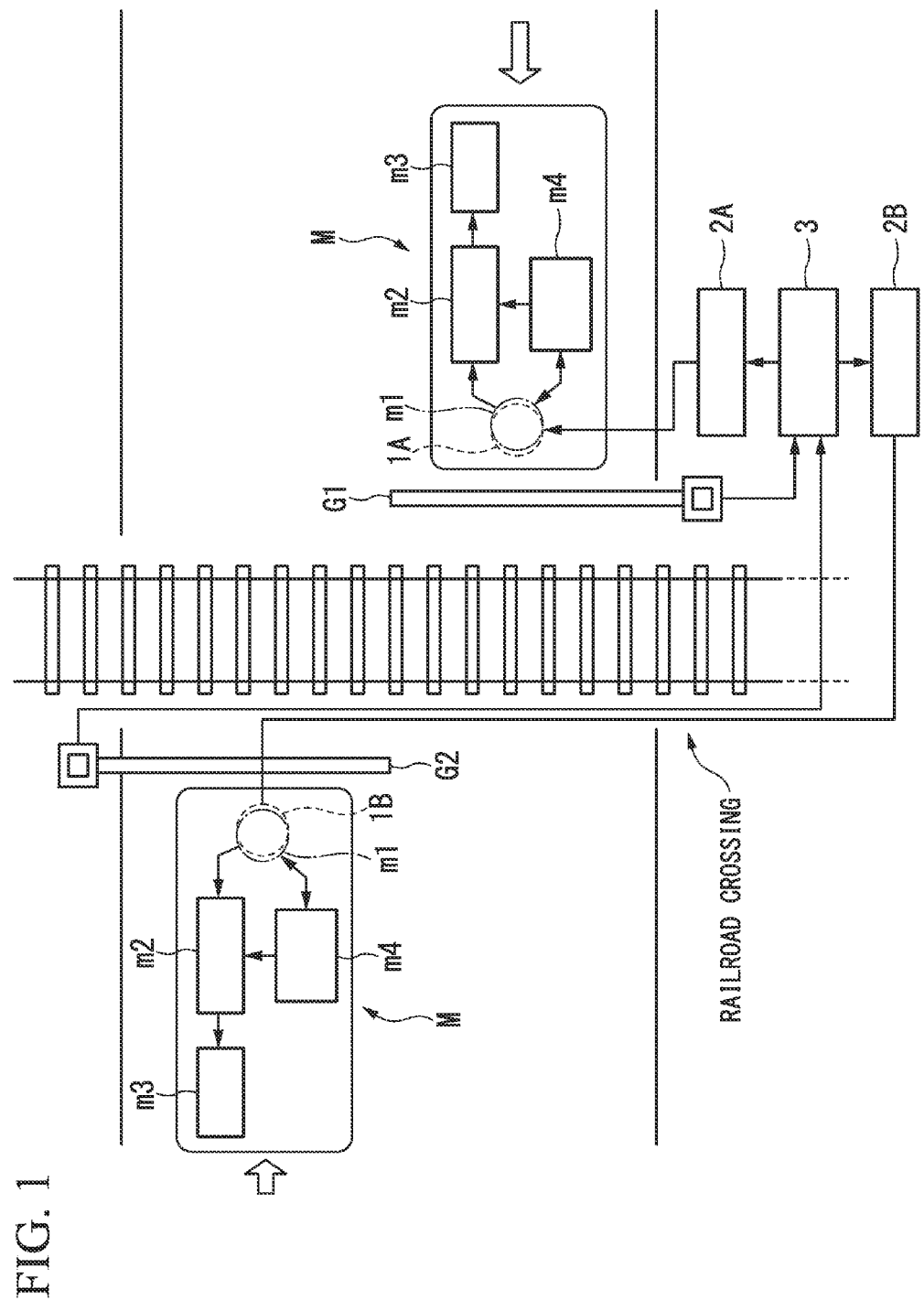
FIG. 1 is a drawing that shows the function constitution of the vehicle electric power feeding system according to the first embodiment of the present invention.

The first embodiment of the present invention shall be described. A vehicle electric power feeding system A according to the first embodiment is, as shown in FIG. 1, provided with two crossing bars G1, G2, two electric power feeding coils 1A, 1B, two electric power feeding converters 2A, 2B, and a control device 3. Note that among these constituent elements, the electric power feeding coils 1A, 1B and the electric power feeding converters 2A, 2B constitute the electric power feeding devices in the first embodiment.

The vehicle electric power feeding system A is an above-ground installation that supplies (feeds) electric power wirelessly to a vehicle M by using the electric power feeding coils 1A, 1B. Also, the vehicle electric power feeding system A detects the stopped state of the vehicle M by receiving a status signal that shows the operating state of the crossing bars G1 G2, which are preexisting equipment. The control device 3 in the vehicle electric power feeding system A corresponds to the detecting means and the control means in the first embodiment. The details will be described below.

The crossing bars G1, G2 are provided at each lane of a road at a railroad crossing. That is to say, the crossing bars G1 is provided in the left lane of a road that crosses a railway line, and the crossing bars G2 is provided in the right lane. The crossing bars G1, G2 assume a closed state when a train passes through the railroad crossing, thereby blocking the passage of vehicles M. The crossing bars G1, G2 enter an opened state in the normal state in which a train does not pass through the railroad crossing, thereby enabling the passage of the vehicles M.

The crossing bars G1, G2 each output a signal that indicates the opened state or the closed state (that is to say, a status signal that indicates its own operation state) to the control device 3. The aforementioned status signal shows the operation state of the equipment (crossing bars G1, G2) capable of putting the vehicles M in a stopped state. Note that, as shown in FIG. 1, in the case of the crossing bars G1, G2 being in the closed state, the vehicles M enter a stopped state on the road in front of the crossing bars G1, G2 (railroad crossing).

The electric power feeding coils 1A, 1B are embedded in the vicinity of the surface of the road in front of the railroad crossing at each lane of the road. That is to say, the electric power feeding coil 1A is embedded in the vicinity of the surface of the road in front of the crossing bars G1. The electric power feeding coil 1B is embedded in the vicinity of the surface of the road in front of the crossing bars G2. In greater detail, as shown in FIG. 1, the embedding locations of the electric power feeding coils 1A, 1B are set to locations that match the stopping positions of the vehicles M in the case of the crossing bars G1, G2 being closed.

The electric power feeding converters 2A, 2B supply alternating current electric power for electric power feeding based on the control signal input from the control device 3. That is to say, the electric power feeding converter 2A supplies alternating current electric power for electric power feeding to the electric power feeding coil 1A, and the electric power feeding converter 2B supplies alternating current electric power for electric power feeding to the electric power feeding coil 1B. The electric power feeding converters 2A, 2B convert commercial electric power such as 50 Hz or 60 Hz to alternating current electric power of a frequency suited to feeding electric power to the vehicles M (for example several hundred Hz to several MHz), and output it to the electric power feeding coils 1A, 1B.

The control device 3 determines (detects) the stopped state of the vehicle M based on the status signal that is input from each crossing bars G1, G2. The control device 3, on the basis of the determination result, instructs the electric power feeding converters 2A, 2B to feed electric power to the vehicle in a stopped state (stopped vehicle). That is to say, the control device 3, upon a status signal that indicates the closed state of each crossing bars G1, G2 being input from each crossing bars G1, G2, determines the vehicle M to be stopped on the road in front of the crossing bars G1, G2. At this time, the control device 3 causes the electric power feeding converters 2A, 2B to commence electric power feeding to the electric power feeding coils 1A, 1B, respectively.

The aforementioned status signal shows the operation state of each of the crossing bars G1, G2, and does not directly show the stopping of the vehicle M. For example, a certain time lag is assumed to occur between the timing of each crossing bars G1, G2 entering the closed state from the opened state, and the timing of a vehicle M stopping (with the extent of this timing considered to depend on the congestion state of the road traffic). Accordingly, upon the status signal that indicates the closed state of each crossing bars G1, G2 being input, the control device 3 determines that the vehicle M has stopped on the road in front of the crossing bars G1, G2 at for example a timing that is delayed by a predetermined time.

Next, the vehicle M, which is the target of the electric power feeding in the vehicle electric power feeding system A, shall be described. As shown in FIG. 1, the vehicle M in the first embodiment is provided with an electric power receiving coil m1, a charging circuit m2, a storage battery m3, and a charge control portion m4.

The electric power receiving coil m1 is provided at the bottom of the vehicle M so as to be capable of facing the aforementioned electric power feeding coil 1A, 1B. The electric power receiving coil m1 has approximately the same coil diameter as the electric power feeding coil 1A, 1B. The electric power receiving coil m1 wirelessly receives alternating current electric power from the electric power feeding coil 1A, 1B by electromagnetically coupling with the electric power feeding coil 1A, 1B. That is to say, the vehicle electric power feeding system A performs wireless power feeding with the vehicle M by causing the electric power feeding coil 1A, 1B to electromagnetically couple with the electric power receiving coil m1 of the vehicle M. Also, the electric power receiving coil m1 outputs the alternating current electric power received from the electric power feeding coil 1A, 1B (received electric power) to the charging circuit m2.

The wireless electric power feeding from the electric power feeding coil 1A, 1B to the electric power receiving coil m1 in the vehicle electric power feeding system A is performed based on the magnetic resonance method. For this reason, a resonance condenser (not illustrated) for constituting a resonance circuit is connected to each of the electric power feeding coil 1A, 1B and the electric power receiving coil m1. Also, the capacitance of each resonance condenser is for example set so that the resonance frequency of the power feeding-side resonance circuit, which consists of the electric power feeding coil 1A, 1B and the resonance condenser, and the resonance frequency of the power receiving-side resonance circuit, which consists of the electric power receiving coil m1 and the resonance condenser, be the same frequency.

The charge control portion m4 performs charge control of the storage battery m3 by controlling the power conversion action of the charging circuit m2. When the charge control portion m4 detects incoming alternating current electric power from the electric power feeding coil 1A, 1B by the electric power receiving coil m1 based on for example a change in the voltage between the terminals of the electric power receiving coil m1, it activates the charging circuit m2 to charge direct current electric power to the storage battery m3.

Next, the operation of the vehicle electric power feeding system A that is constituted as described above shall be described in detail.

The vehicle electric power feeding system A works in cooperation with the operating state of each crossing bars G1 G2. For this reason, each time the crossing bars G1, G2 enter the closed state due to a train passing through the level crossing, wireless electric power feeding to the vehicle M that is stopped on the road before each crossing bars G1, G2 (level crossing) is started.

That is to say, the control device 3 always monitors the status signal that is input from each crossing bars G1, G2. When the status signal indicates the closed state of the crossing bars G1, G2, the control device 3 determines (detects) that the vehicle M has stopped on the road in front of the crossing bars G1, G2. Then, the control device 3 outputs a control signal to each electric power feeding converter 2A, 2B to start the power supply to the respective electric power feeding coil 1A, 1B.

In the case of the vehicles M that are stopped (stopped vehicles) being on each lane of the road in the state of each electric power receiving coil m1 being positioned in the vicinity above the electric power feeding coils 1A, 1B the electric power receiving coil m1 of each vehicle M (stopped vehicle) electromagnetically couples with the electric power feeding coils 1A, 1B. As a result, the alternating current electric power that is supplied from each electric power feeding converter 2A, 2B to each electric power feeding coil 1A, 1B is wirelessly transmitted from each electric power feeding coil 1A, 1B to the electric power receiving coil m1 of each vehicle M (stopped vehicle).

The alternating current electric power that is wirelessly transmitted from the electric power feeding coil 1A, 1B to the electric power receiving coil m1 reaches a maximum in the state of the electric power receiving coil m1 frontwardly facing the electric power feeding coil 1A, 1B from directly above (that is to say, the state of the electric power receiving coil m1 and the electric power feeding coil 1A, 1B being brought into the closest proximity), but the stopped position of the vehicle M varies as it depends on the driving operation of the driver. Accordingly, the electric power receiving coil m1 rarely frontwardly faces the electric power feeding coil 1A, 1B. However, since the vehicle electric power feeding system A adopts the magnetic resonance method, the transmission efficiency of the alternating current electric power that is wirelessly transmitted from the electric power feeding coil 1A, 1B to the electric power receiving coil m1 is high.

The control device 3 continues the wireless electric power feeding to the vehicle M (stopped vehicle) via the electric power feeding coil 1A, 1B while the status signal indicates the closed state of the crossing bars G1, G2. When a status signal indicating that the crossing bars G1, G2 has transitioned from the closed state to the opened state is input, the control device 3 determines that the vehicle M (stopped vehicle) has started moving. The control device 3 outputs a control signal to the electric power feeding converter 2A, 2B to stop the electric power supply to the electric power feeding coil 1A, 1B.

According to the first embodiment, in coordination with the operation of the crossing bars G1, G2, it is possible to wirelessly feed electric power to a vehicle M that is stopped by utilizing the stoppage of the vehicle M, even though it is for a comparatively short time. Accordingly, according to the first embodiment, it is possible to realize electric power feeding to vehicles M in various locations. As a result, it is possible to promote the adoption and improve the convenience of vehicles M that move with electric power serving as the power source.

(Second Embodiment)

Figure 2:
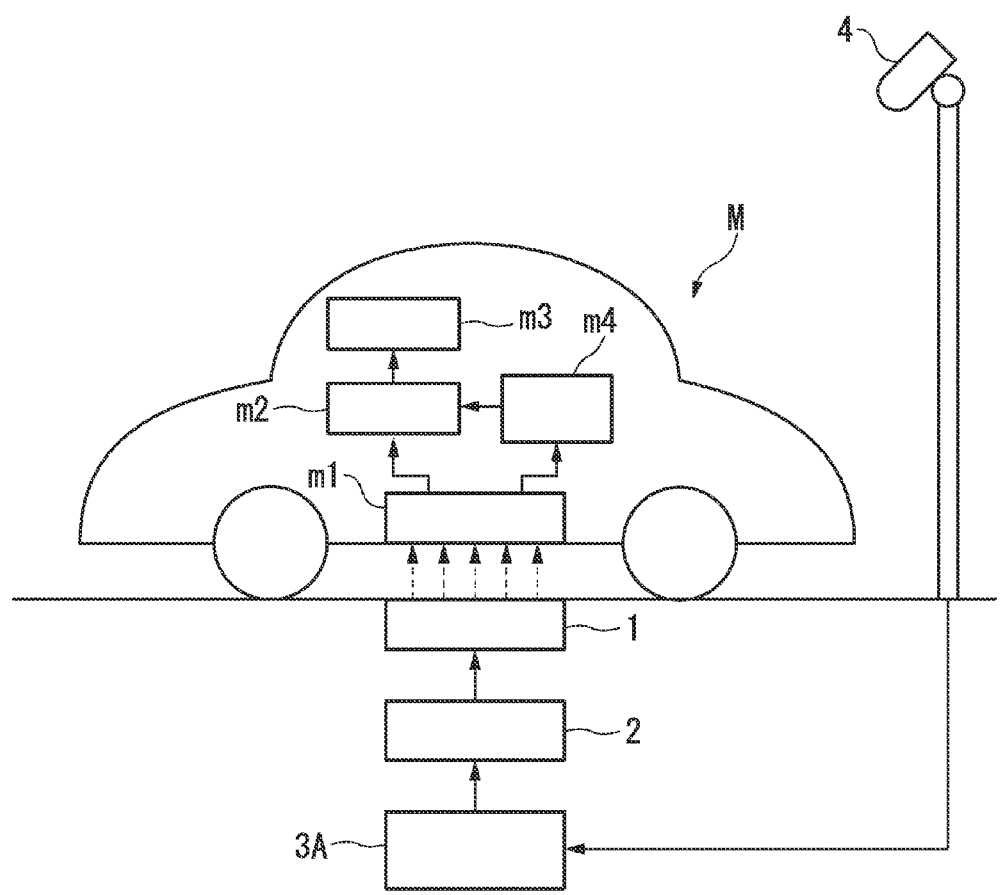
FIG. 2 is a drawing that shows the function constitution of the vehicle electric power feeding system according to the second embodiment of the present invention.

The second embodiment of the present invention shall be described. As shown in FIG. 2, the vehicle electric power feeding system B is provided with an electric power feeding coil 1, an electric power feeding converter 2, a vehicle sensor 4, and a control device 3A. Note that the electric power feeding coil 1 and the electric power feeding converter 2 constitute the electric power feeding device in the second embodiment.

Figure 3:
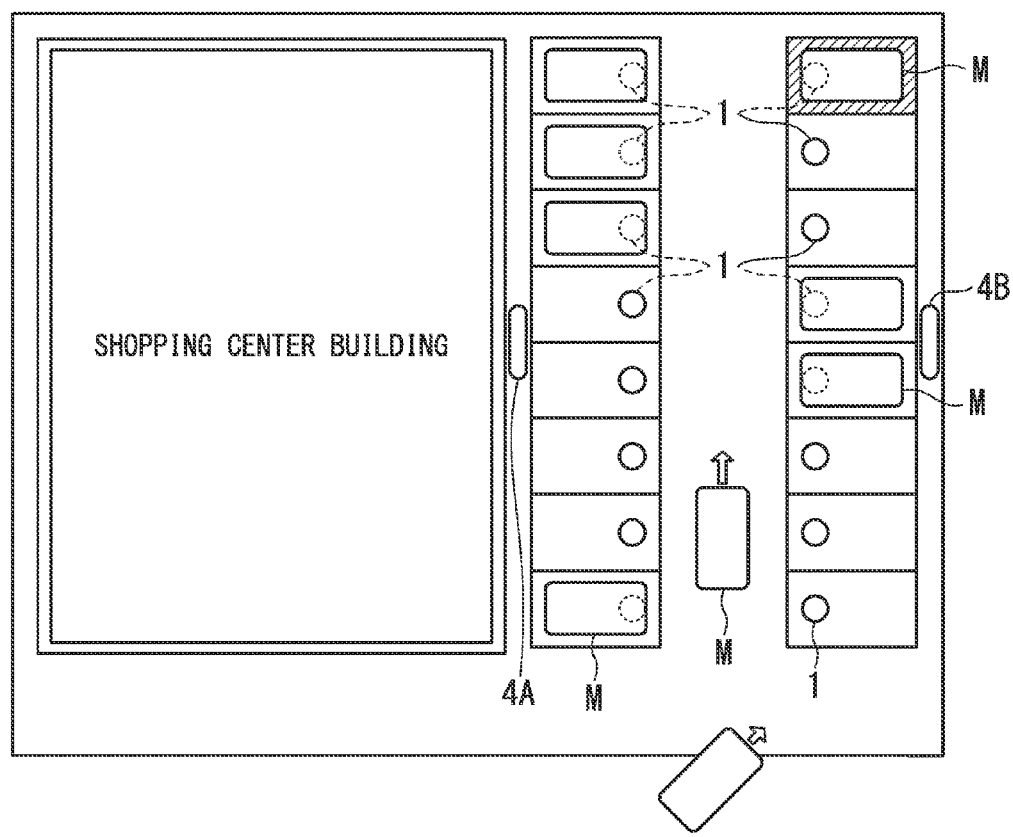
FIG. 3 is a schematic drawing that shows an example installation of the vehicle electric power feeding system according to the second embodiment of the present invention.

The electric power feeding coil 1 has the same function as the electric power feeding coils 1A, 1B in the first embodiment. The number and position of the electric power feeding coil 1 are appropriately set in accordance with the properties of the location where the vehicles M are capable of stopping. For example, in the case of a parking lot of a shopping center as shown in FIG. 3, the electric power feeding coil 1 is provided near the surface of the ground in every parking space. The electric power feeding converter 2 has the same function as the electric power feeding converters 2A, 2B of the first embodiment. The electric power feeding converter 2 is provided with its position and number set in accordance with the electric power feeding coil 1. The electric power feeding converter 2 supplies alternating current electric power for electric power feeding to the electric power feeding coil 1, on the basis of a control signal that is input from the control device 3A.

The vehicle sensor 4 is a detecting means that detects the stopped state of the vehicle M, with the number and position thereof being appropriately set in accordance with the properties of the location where the vehicles M are capable of stopping. For example, in the case of a parking lot of a comparatively large shopping center as shown in FIG. 3, two vehicle sensors 4A, 4B are provided. In this case, for the vehicle sensor 4A, half of the parking lot of the shopping center (the left-side half) serves as the detection area, while for the vehicle sensor 4B the remaining half (right-side half) serves as the detection area. The vehicle sensors 4 (4A, 4B) output a vehicle detection signal that indicates the detection result to the control device 3A.

The vehicle sensor 4 (4A, 4B) is for example a laser radar that detects the stopped state of the vehicles M, with laser light serving as the detecting medium. That is to say, the vehicle sensor 4 (4A, 4B) radiates laser light in a scanning shape from a high location onto the detection area, and by receiving the reflected light of the laser light, measures the distance to the reflection point. Also, the vehicle sensor 4 (4A, 4B) detects where the vehicles M in a stopped state (stopped vehicles) exist in the plurality of parking spaces based on the measurement result (distance detection value) and the irradiation positions of the laser light.

The reflection point of the laser light that is radiated onto a parking space becomes the surface of the parking space (that is to say, the ground) in the case of a vehicle M (stopped vehicle) not existing, and becomes the surface of the roof or the like of the vehicle M (stopped vehicle) in the case of the vehicle M (stopped vehicle) existing there. Accordingly, the distance detection value of the vehicle sensor 4 (4A, 4B) clearly differs in accordance with the presence of the vehicle M (stopped vehicle).

The control device 3A instructs the electric power feeding converter 2 to feed electric power to the vehicle M (stopped vehicle) based on the vehicle detection signal that is input from the vehicle sensor (4A, 4B). That is to say, when a vehicle detection signal that shows that a vehicle M is stopped in for example the far-right parking space denoted by diagonal lines is input, the control device 3A outputs a control signal to the electric power feeding converter 2 corresponding to the electric power feeding coil 1 that is provided in the far-right parking space to commence electrical power supply.

In the vehicle electric power feeding system B, vehicles M (stopped vehicles) are detected in the parking spaces by the vehicle sensor 4 (4A, 4B). At this time, the control device 3A outputs a control signal to the electric power feeding converters 2 corresponding to the electric power feeding coils 1 that are provided in the parking space to commence the electric power supply to the electric power feeding coils 1. When the vehicle M stops in a parking space, the electric power receiving coil m1 of the vehicle M (stopped vehicle) is positioned in the vicinity above the electric power feeding coil 1, and electromagnetically couples with the electric power feeding coil 1. As a result, the alternating current electric power that is supplied from the electric power feeding converter 2 to the electric power feeding coil 1 is transmitted wirelessly from the electric power feeding coil 1 to the electric power receiving coil m1 of the vehicle M (stopped vehicle).

The vehicle electric power feeding system B adopts the magnetic resonance method similarly to the first embodiment. For that reason, the transmission efficiency of the alternating current electric power that is contactelessly transmitted from the electric power feeding coil 1 to the electric power receiving coil m1 is high. The vehicle sensor 4 (4A, 4B) always detects the stopped state of each vehicle M in its respective detection area.

The control device 3A continues the wireless electric power feeding to the vehicle M (stopped vehicle) via the electric power feeding coil 1 while the vehicle detection signal that is input from the vehicle sensor 4 (4A, 4B) indicates the stopped state of the vehicle M (stopped vehicle). When the aforementioned vehicle detection signal indicates the start of movement of the vehicle M (stopped vehicle), the control device 3A outputs a control signal to the electric power feeding converter 2 corresponding to the parking space (electric power feeding coil 1) of the vehicle M (stopped vehicle) that has started to move to stop the electric power to the electric power feeding coil 1.

According to the second embodiment, it is possible to wirelessly feed electric power to the vehicle M (stopped vehicle), working together with the detection result of the vehicle M (stopped vehicle) by the vehicle sensor 4 (4A, 4B). Accordingly, the second embodiment is capable of realizing electric power feeding to mobile vehicles in various locations, compared to the conventional system that works in conjunction with traffic signals. As a result, it is possible to promote the adoption and improve the convenience of vehicles M that move with electric power serving as the power source.

Note that the present invention is not limited to the aforementioned embodiments, and for example the following modifications are conceivable.

(1) In the first embodiment, the electric power feeding coils 1A, 1B are provided at locations matching the stopping positions of the vehicles M at the front of each lane, but the electric power feeding coil 1 may also be provided at positions matching the stopping positions of follow-on vehicles M. In this case, the stopping positions of the vehicles M change depending on the size (vehicle length) of the vehicle M at the front and each of the follow-on vehicles M. For this reason, the electric power feeding coils 1A, 1B for the follow-on vehicles M are for example embedded at a vehicle length interval of the vehicle M with the shortest vehicle length. The number of electric power feeding coils 1A, 1B in each lane is appropriately set in accordance with the amount of traffic and the like of the road.

(2) In the first embodiment, by embedding the electric power feeding coils 1A, 1B in the road and providing the electric power receiving coils m1 at the bottom of the vehicles M, the electric power feeding coil 1A, 1B and the electric power receiving coil m1 are made to face each other in the vertical direction. The present invention is not limited to this. For example, the electric power receiving coil m1 may be provided at the side portion of the vehicle M (the boarding and alighting door), and the electric power feeding coils 1A, 1B may be provided at the shoulder of the road with the center axis being horizontal and at an orientation that is perpendicular with the axis of the lane so as to face the side portion (boarding and alighting door) of the vehicle M. Also, the electric power receiving coil m1 may be provided in the roof of the vehicle M, and the electric power feeding coils 1A, 1B may be provided above the road so as to face the roof of the vehicle M.

(3) In the first embodiment, electric power feeding was unconditionally commenced to the vehicle M that had stopped on the road in front of each crossing bars G1, G2. The present invention is not limited to this. For example, by diverting the electric power feeding coil 1A, 1B, and the electric power receiving coil m1 to signal transmission, wireless communication between the control device 3 and the charge control portion m4 may be made possible through the electric power feeding coil 1A, 1B and the electric power receiving coil m1, and the stopping state of the vehicle M may be judged by that wireless communication. Thereby, prior to commencing electric power feeding, the necessity of the electric power feeding may be confirmed, or transmission and reception of billing information relating to the electric power feeding and the like may be performed. In this case, the electric power feeding coil 1A, 1B, and the electric power receiving coil m1 function as antennas for wireless communication, and the control device 3 and the charge control portion m4 function as communication means that use the antennas.

(4) Instead of a communication device that uses the electric power feeding coil 1A, 1B, and the electric power receiving coil m1, a discrete communication function may be provided in the vehicle electric power feeding system A (above-ground equipment) and the vehicle M. For example, it is conceivable to use a widely known optical beacon as the discrete communication function, and to use a transceiver using electromagnetic waves as a discrete communication function. In particular, as a discrete communication function, since communication between the vehicle electric power feeding system A (above-ground equipment) and the vehicle M (that is to say, comparatively short-distance communication) may be possible, a dedicated communication system may be used.

(5) In the first embodiment, it worked in conjunction with the crossing bars G1, G2. The present invention is not limited to this. Besides the crossing bars G1, G2, equipment that can put the vehicle M in a stopped state includes crossing gates that are provided at the parking lot entrance of various facilities, and traffic signals that are provided on roads (public roads). Accordingly, by incorporating the status signal that shows the operating state of these crossing gates, electric power feeding to the vehicles M may be controlled. That is to say, the location of performing wireless electric power feeding is not limited to public roads and may be private roads or private property.

(6) In the first embodiment, the stopped state of the vehicle M was determined by incorporating the status signal of the crossing bars G1, G2 in the control device 3 in order to more reliably detect the operating state of the crossing bars G1, G2. The present invention is not limited to that. In the case of incorporation of the status signal of the equipment that can put the vehicle M in a stopped state being difficult, the operating state of equipment such as the crossing bars G1, G2 that can put the vehicle M in a stopped state may be detected by a device that is separately provided. For example, for the operation condition of the crossing bars G1, G2 or traffic signals, it is conceivable to detect the closed state and the opened state by acquiring images of the crossing bars G1, G2 and performing image processing on the images. As a still different method of determining the stopped state of the vehicle M, the performance of an operation that is executed only at the time of the vehicle M being in the stopped state may also be utilized. For example, the vehicle M may be determined to be in a stopped state when the emergency brake is activated, or when the shift lever in an automatic transmission vehicle is shifted to "P" position.

(7) FIG. 1 that shows the first embodiment shows an example of a plurality of lanes being oppositely arranged adjacent to each other. The present invention is not limited to this. The plurality of lanes may be in the same direction, and the plurality of lanes may be physically separated.

(8) In the second embodiment, a description is given for the parking lot of a shopping center schematically shown in FIG. 3 as an example of a location where the vehicle M can park. The present invention is not limited to this. The parking lot in which the vehicle electric power feeding system B is installed may be any parking lot of a public facility or a private facility. Also, the location where the vehicle M can stop may be a drive-through site at a shop in addition to a parking lot, and may also be a stopping site such as a gas station in the case of the vehicle M being a hybrid vehicle.

(9) In the second embodiment, the electric power feeding coil 1 and the electric power receiving coil m1 are made to face each other in the vertical direction by embedding the electric power feeding coil 1 near the surface of the parking space (ground) and providing the electric power receiving coil m1 at the bottom of the vehicle M. The present invention is not limited to this. For example, the electric power receiving coil m1 may be provided in the side portion (boarding and alighting door) of the vehicle M, and the electric power feeding coil 1 may be provided at the side of the parking space in an orientation that faces the side portion (boarding and alighting door) of the vehicle M. In addition, the electric power receiving coil m1 may be provided in the roof of the vehicle M, and the electric power feeding coil 1 may be provided above the parking space so as to face the roof of the vehicle M.

(10) In the second embodiment, electric power feeding is unconditionally carried out to the vehicles M stopped in the parking spaces (stopped vehicles). The present invention is not limited to that. Wireless communication between the control unit 3 and the charge control portion m4 may also be enabled by diverting the electric power feeding coil 1 and the electric power receiving coil m1 to signal transmission. Thereby, prior to commencing electric power feeding, the necessity of the electric power feeding may be confirmed, or transmission and reception of billing information relating to the electric power feeding and the like may be performed by the wireless communication. In this case, the electric power feeding coil 1 and the electric power receiving coil m1 function as antennas for wireless communication, and the control device 3A and the charge control portion m4 function as communication means that use the antennas.

Also, wireless communication may also be performed using a discrete communication means that is separately provided, without diverting the electric power feeding coil 1 and the electric power receiving coil m1 to signal transmission.

(11) In the second embodiment, the stopped state of the vehicle M is detected with the vehicle sensor 4 (4A, 4B) serving as a detecting means, and this detection result is output to the control device 3A. The present invention is not limited to this. For example, measurement data from the vehicle sensor may be supplied to the control device, and the control device may detect (determine) the stopped state of the vehicle M based on the measurement data. As a still different method of determining the stopped state of the vehicle M, the performance of an operation that is executed only at the time of the vehicle M being in the stopped state may also be utilized. For example, the vehicle M may be determined to be in a stopped state when the emergency brake is activated, or when the shift lever in an automatic transmission vehicle is shifted to "P" position.

(12) In the second embodiment, laser radar is used as the vehicle sensor 4 (4A, 4B). The present invention is not limited to this. Instead of laser radar, a combination of a television camera and an image processing device that processes images obtained from the television camera may serve as the vehicle sensor. That is to say, the vehicle sensor 4 (4A, 4B) periodically captures an image that includes the detection area, compares it with a reference image of the state in which no vehicles are stopped in the detection area, and detects where vehicles M in the stopped state (stopped vehicles) exist in any of the plurality of parking spaces.

(13) In the first embodiment or the second embodiment, the electric power that is fed to a vehicle may be used not just for charging of the battery, but also for driving of the lighting equipment and air conditioning in the vehicle.

Preferred embodiments of the present invention are described in detail hereinabove while referring to the appended drawings, but the present invention is not limited to the above embodiments. The various shapes and combinations of each composite member shown in the embodiment described above refer to only examples, and may be altered in various ways based on design requirements and so forth within a scope that does not deviate from the subject matter of the present invention.

INDUSTRIAL APPLICABILITY

According to the present invention, it is possible to realize electric power feeding to vehicles in more varied places than conventional systems that work in conjunction with traffic signals, and to realize promotion of the adoption and improvement in the convenience of vehicles that move with electric power serving as the power source.

DESCRIPTION OF THE REFERENCE SYMBOLS

A, B: vehicle electric power feeding system, M: vehicle, G1, G2: crossing bar, m1: electric power receiving coil, m2:

charging circuit, m3: storage battery, m4: charge control portion, 1, 1A, 1B: electric power feeding coil, 2, 2A, 2B: electric power feeding converter, 3, 3A: control device, 4, 4A, 4B: vehicle sensor

The invention claimed is:

1. A vehicle electric power feeding system comprising:
an electric power feeding device configured to be provided at a location at which a vehicle can stop;
a detecting means configured to detect the stopped state of the vehicle according to a status signal indicating an operation state of an equipment operable for putting the vehicle in the stopped state;
upon receiving the status signal, the detecting means being configured to determine that the vehicle is in the stopped state, at a timing delayed by a predetermined time;
a control means configured to instruct the electric power feeding device to feed electric power to the vehicle in the stopped state on the basis of a detection result of the detecting means; and
a communicator configured to perform communication with the vehicle;
wherein the vehicle has the capability to communicate with the communicator;
the control means is configured to perform one or both of information exchange relating to one or both of the stopped state of the vehicle or to power feeding by the power feeding device, by performing communication with the vehicle via the communicator.

2. The vehicle electric power feeding system according to claim 1, wherein:
the electric power feeding device is provided with an electric power feeding coil;
the vehicle is provided with an electric power receiving coil; and
the electric power feeding device is configured to perform wireless electric power feeding to the vehicle by causing the electric power feeding coil to couple electromagnetically with the electric power receiving coil.

3. The vehicle electric power feeding system according to claim 1, wherein the location at which the vehicle can stop is one or both of a parking area of various kinds of facilities or houses, and a temporary stopping place of a public establishment or private establishment.

* * * * *